UNITED STATES PATENT OFFICE.

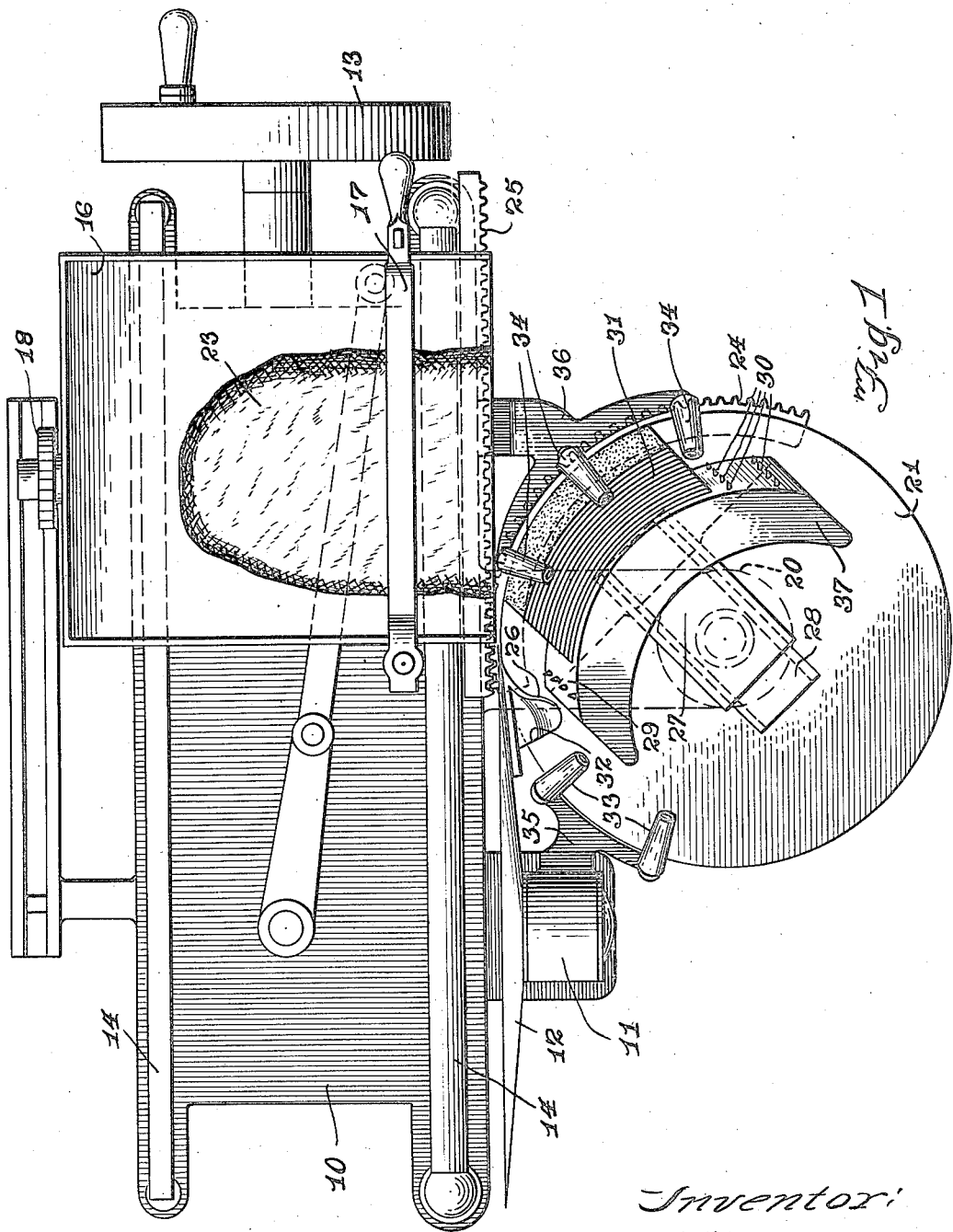

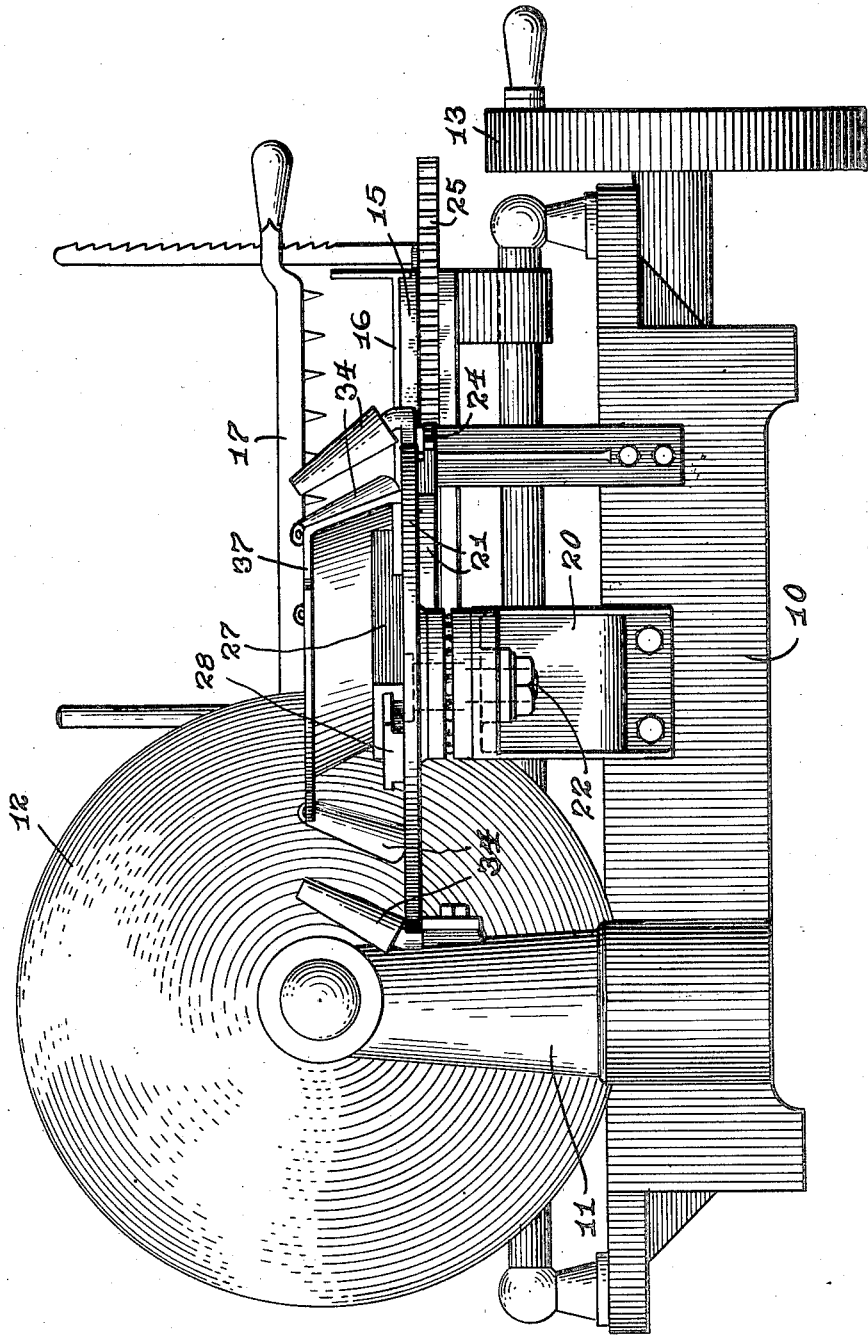

EDWARD M. STILES, OF MOUNT PLEASANT, IOWA, ASSIGNOR TO U. S. SLICING MACHINE COMPANY, OF LAPORTE, INDIANA, A CORPORATION OF INDIANA.

SLICE-COLLECTOR.

1,324,214.      Specification of Letters Patent.      Patented Dec. 9, 1919.

Application filed September 24, 1917. Serial No. 193,035.

*To all whom it may concern:*

Be it known that I, EDWARD M. STILES, a citizen of the United States, residing at Mount Pleasant, in the county of Henry and State of Iowa, have invented certain new and useful Improvements in Slice-Collectors, of which the following is a specification.

This invention relates to a device for collecting slices as they are formed by a slicing machine, and has for its object the provision of a device of the character named which shall be of improved construction and more efficient, convenient and economical in operation than other devices for a similar purpose previously known.

The invention is exemplified in the combination and arrangement of parts shown in the accompanying drawings and described in the following specification, and it is more particularly pointed out in the appended claims.

In the drawings—Figure 1 is a top plan view of a slicing machine to which one embodiment of the present invention is applied, and Fig. 2 is a side elevation of the machine shown in Fig. 1.

This invention may be applied to various forms of slicing machines, the form represented in the drawings being one which is well known in the art, and comprises a base frame 10 on which is mounted a standard 11 which carries a rotary disk slicing knife 12 driven by a hand wheel 13 by well known power transmission mechanism. Base 10 is provided with a pair of ways 14 on which is slidably mounted a reciprocating meat table 15 which carries a sliding meat plate 16 provided with a meat clamp 17 and ratchet feeding mechanism 18, all of which is common in the art.

Secured to the base 10 is a bracket 20 which has a rotary slice receiving table 21 secured thereon by a pivot pin 22. The upper surface of the table 21 is approximately level with the upper surface of the meat plate 16 and the periphery of the table 21 lies adjacent the edge of the meat table 15 at the point where the slices are severed by the knife 12, so that the slice receiving table 21 extends beneath the lower edge of a slice of meat as it is severed from the main body of the material being sliced, which is represented at 23 in the drawings. The receiving table 21 is caused to rotate in unison with the reciprocation of the table 15 by means of a segmental rack 24 secured to the periphery of the table 21 and arranged to mesh with a straight rack 25 carried by the edge of the reciprocating table 15. The slices as they are formed are deflected from the lateral surface of the knife 12 toward the receiving table 21 by a deflector plate 26 which has its forward edge shaped to conform to the periphery of the knife 12 and lying adjacent the cutting portion of the knife. The deflecting portion of the plate 26 has a shape similar to the shape of a plow share and not only moves the slice laterally away from the surface of the knife, but also tends to turn the slice over into an inclined position. As the slice is thus turned by the deflector 26, it is received by a sliding block 27 mounted upon the upper surface of the table 21 and arranged to move upon a dove-tailed guide 28 across the surface of the table. The front surface 29 of the block 27 is inclined backwardly and is provided with a series of points 30 which enter the first slice of meat laid against the surface 29. Subsequent slices of meat are stacked against one another, as shown at 31 in Fig. 1 of the drawings. As each slice is cut, the block 27 and the stack of slices 31 are moved backwardly across the surface of the receiving table 21 by means of the deflector 26 a distance equal to the thickness of the slice being formed, thus leaving a space to receive the next succeeding slice.

Since the table is returned to its starting position after each slice, it is desirable to curve the rear edge of the deflector 26 slightly inwardly, as shown at 32, to prevent the edge of the deflector from catching against the outermost slice as the stack 31 is carried toward the position shown in Fig. 1. To prevent the slices from being misplaced due to the centrifugal force of the table 21 when the machine is operated rapidly, a series of rollers 33 and 34 are supported on brackets 35 and 36, respectively, which are secured to the frame of the slicing machine. These rollers engage the outer surface of the outermost slice during the movement of the table 21 and hold the slices in place upon the table. When the desired number of slices have been formed they may be removed by either rotating the table into a position to bring the stack of slices out of engagement with the rollers 34, or the entire stack of slices and the block 27 may be slid rearwardly a sufficient distance to bring the slices out of contact with the rollers. Where comparatively thin material, such as bacon is being sliced, the slices will be relatively narrow and will not extend above the surface 29 of the block 27. If thicker material is being sliced, the slices will be of a greater width than the surface 29 and the portion of the slices above the block 27 will bend over and lie upon the horizontal portion 37 of the block 27 which forms a table or shelf for supporting the upper portion of wide slices.

I claim:

1. In combination, a slicing machine having a reciprocating table, a rotary table for receiving the slices formed by said machine, and means for supporting slices on said table in a recumbent position, said supporting means being movable on said table to accommodate different numbers of slices.

2. In combination, a slicing machine having a movable support for material to be sliced, a rotary table for receiving slices formed by said machine, means for supporting a plurality of slices upon said table in a recumbent position, and means for holding said slices upon said table against centrifugal force.

3. In combination, a slicing machine having a movable support for material to be sliced, a rotary table for receiving slices as they are formed by said machine, means for moving said rotary table in unison with the movement of said support, means for maintaining slices upon said table in an inclined position, said maintaining means being movable upon said table to accommodate different numbers of slices, and a deflector for directing the slices as they are formed into position to be supported by said maintaining means.

4. In combination, a slicing knife, means for moving material relative to said knife to cause a slice to be severed therefrom, a deflector arranged to direct the slices formed by said knife into an inclined position, an inclined support for receiving said slices and a slideway on said table for said support on which slideway said support moves to accommodate the slices as they are deposited thereon.

5. In combination, a slicing knife, a support movable relative to said knife for presenting material thereto, a deflector arranged to direct the slices as they are formed into an inclined position, an inclined support for receiving the slices from said deflector, means for moving said inclined support in unison with said first mentioned support and means for maintaining said inclined support for movement in a direction transverse to the direction of the surface of said slices, to accommodate the different thicknesses of the stack of slices thereon.

6. In combination, a slicing knife, a support movable relative to said knife for presenting material thereto, a receiver having an inclined slice supporting surface, and a deflector for directing slices into an inclined position in which they are retained by said slice supporting surface, said receiver being movable to accommodate a plurality of slices as they are formed by said slicing knife.

7. In combination, a slicing knife, a support movable relative to said knife for presenting material thereto, a rotary slice receiving table, means for reciprocating said table in unison with said support, an inclined slice retainer positioned upon said table and movable relative thereto to accommodate different numbers of slices, and a deflector for successively directing slices into a recumbent position against said slice retainer.

8. In combination, a slicing machine having a slicing knife and a table arranged to reciprocate relative thereto, a rotary slice receiving table positioned adjacent the cutting portion of said knife, means for reciprocating said rotary table in unison with said first mentioned table, an inclined slice support mounted on said rotary table and movable thereon to accommodate a plurality of slices as they are formed by said slicing knife, a deflector for directing the slices into a recumbent position against said slice support, and means for engaging said slices during the rotation of said table to hold them against the action of centrifugal force.

9. The combination with a slicing machine, of a rotary support for receiving slices formed by said machine, and means located adjacent the path of movement of the slices on said support for holding said slices on said support against the action of centrifugal force at all positions of said slices during movement of said support.

10. The combination with a slicing knife, of a rotary table arranged adjacent the cutting edge of said knife for receiving slices therefrom, and a guard located adjacent the periphery of said table and in front of the cutting edge of said knife for holding slices on said table against the action of centrifugal force.

11. The combination with a slicing machine having a slicing knife and a reciprocating table for presenting material to said knife, of a rotary table adjacent the cutting edge of said knife for receiving slices therefrom, an inclined support for the slices received by said rotary table, said support being arranged to be moved across said table to accommodate the slices as they are deposited thereon, a deflector for directing slices onto said inclined support, and means located adjacent the path of movement of the slices on said rotary table for engaging said slices at the various positions thereof in the normal movement of said table to hold the slices on said table against the action of centrifugal force.

In testimony whereof I have signed my name to this specification, on this 18th day of September, A. D. 1917.

EDWARD M. STILES.

Witnesses:
 THOMAS H. STILES,
 WILLIAM R. BUDDE.